United States Patent [19]

Jaffe

[11] Patent Number: 4,655,570

[45] Date of Patent: Apr. 7, 1987

[54] CAMERA WITH A BORDER IMAGE PRODUCING DEVICE

[76] Inventor: Hal R. Jaffe, 7121 Rico Cv., Germantown, Tenn. 38138

[21] Appl. No.: 789,570

[22] Filed: Oct. 21, 1985

[51] Int. Cl.$^4$ .............................................. G03B 17/24
[52] U.S. Cl. .................................. 354/107; 354/295; 355/40
[58] Field of Search ............... 354/105, 106, 107, 108, 354/109, 125, 295, 296; 355/40, 41

[56] References Cited

U.S. PATENT DOCUMENTS

| 2,971,444 | 2/1961 | Grotzschel et al. | 354/105 |
| 3,488,753 | 1/1970 | Tone et al. | 354/107 |
| 3,916,423 | 10/1975 | Ueda et al. | 354/108 |
| 4,123,767 | 10/1978 | Halpern | 354/107 |
| 4,153,365 | 5/1979 | English et al. | 354/108 |
| 4,154,526 | 5/1979 | Kostiner | 354/107 |
| 4,268,144 | 5/1981 | Wheeler | 354/108 |
| 4,304,471 | 12/1981 | Jones | 354/108 |
| 4,310,232 | 1/1982 | Reed | 354/296 |
| 4,427,791 | 1/1984 | Edelstein et al. | 354/107 |

*Primary Examiner*—A. A. Mathews
*Attorney, Agent, or Firm*—Walker & McKenzie

[57] ABSTRACT

A camera for producing a picture having a photograph area and a border area extending completely about the photograph area. The camera includes a template for being placed over a frame of photographic film, the template having a border area; structure for preventing light entering the camera through the lens/shutter structure thereof from passing through the border area of the template; and a light unit for emitting light through the border area of the template to create a specific border image on the border area of the frame of photographic film.

11 Claims, 10 Drawing Figures

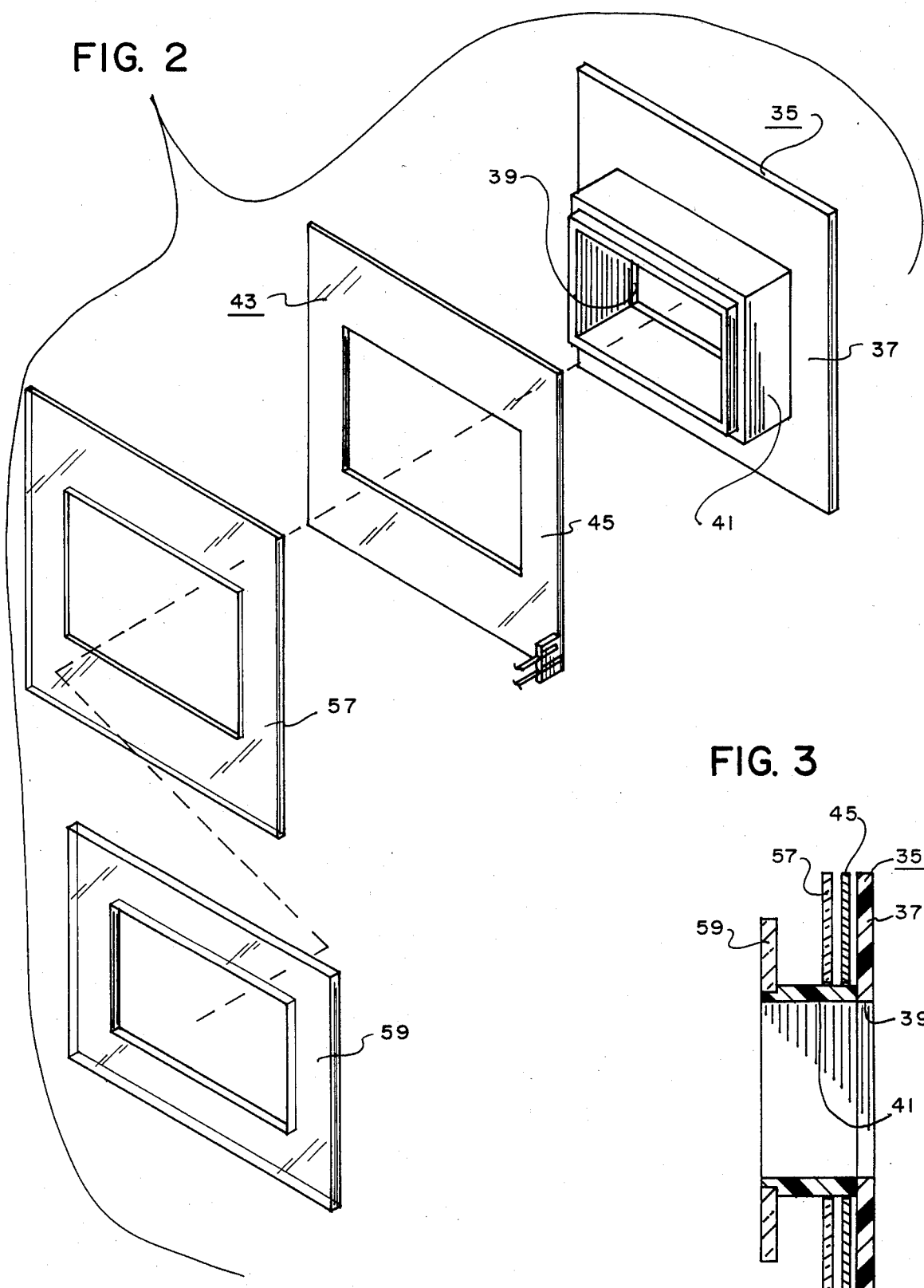
FIG. 2
FIG. 3
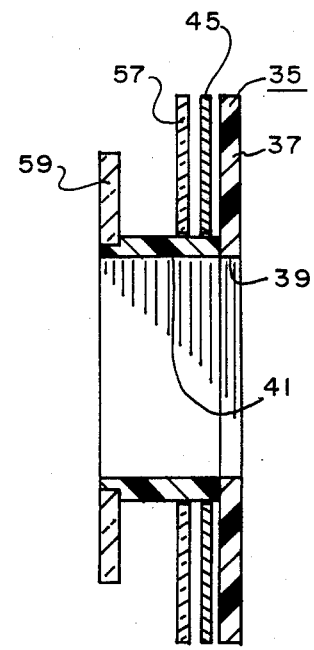

CAMERA WITH A BORDER IMAGE PRODUCING DEVICE

BACKGROUND OF THE INVENTION

1. Field of the Invention

The present invention relates in general to means for producing a border completely about a photograph at the time the photograph is originally exposed.

2. Description of the Prior Art

Heretofore, the typical method used to produce a border on a photograph at the time the photograph is originally exposed has been to utilize a masking system such as disclosed by Jones, U.S. Pat. No. 4,304,471 in which a mask is positioned between the lens of the camera and the "frame" of photographic film to be exposed whereby light entering the camera through the lens will be at least partially blocked by the mask thereby producing a border or the like on the frame of photographic film as the film is exposed. A problem with such mask systems is that they are dependent upon the light entering the camera through the lens means thereof and often result in an underexposed and/or superimposed border. Wheeler, U.S. Pat. No. 4,268,144 discloses a specific masking system in which a transparent template is positioned directly over the film of a typical "Polaroid" self-developing film pack or the like.

Edelstein, U.S. Pat. No. 4,427,279 discloses a camera specifically adapted to produce composite photographs containing both a picture and written information. The camera includes a frame for resting over the film, the frame having an opening therethrough which defines an unobstructed path from the lens of the camera so that an image in the lens is transmitted onto the photo area of the film in the usual manner. The frame also includes structure for holding a slide over a portion of the film and includes a light bulb for selectively illuminating the slide to cause information on the slide to be produced on the film.

In addition to the above cited patents, a preliminary patentability search in class 354 produced the following patents: Grotzschel, U.S. Pat. No. 2,971,444; English, U.S. Pat. No. 4,153,365; and Kostiner, U.S. Pat. No. 4,154,526. None of the above patents disclose or suggest the present invention.

SUMMARY OF THE INVENTION

The present invention provides a camera which allows a border to be produced completely about the periphery of a frame of photographic film as the frame of photographic film is exposed. The concept of the present invention is to locate a template means and a light producing means within the interior of the camera to produce an evenly exposed border about the entire periphery of a frame of photographic film.

A camera including the present invention will include a hollow body for holding a frame of photographic film; a lens/shutter means attached to the body for selectively allowing light from a specific image to enter the body and expose the frame of photographic film; template means located within the body for covering the peripheral edges of the frame of photographic film to divide the frame of photographic film into a border area about the peripheral edges thereof and a photograph area within the border area and for allowing light to pass through at least a portion thereof to expose a specific border image on the border area of the frame of photographic film; light block means located within the body for covering the border area of the frame of photographic film and for preventing light from the lens/shutter means from passing to the border area of the frame of photographic film; and light means located within the body for emitting even light about the border area of the frame of photographic film through the template means to expose the specific border image on the border area of the frame of photographic film.

BRIEF DESCRIPTION OF THE DRAWINGS

FIG. 2 is an exploded perspective view of a light meanslight block means unit of the improved camera of the present invention.

FIG. 3 is a sectional view of the light means-light block means unit of FIG. 2.

DESCRIPTION OF THE PREFERRED EMBODIMENT

Figure 1:
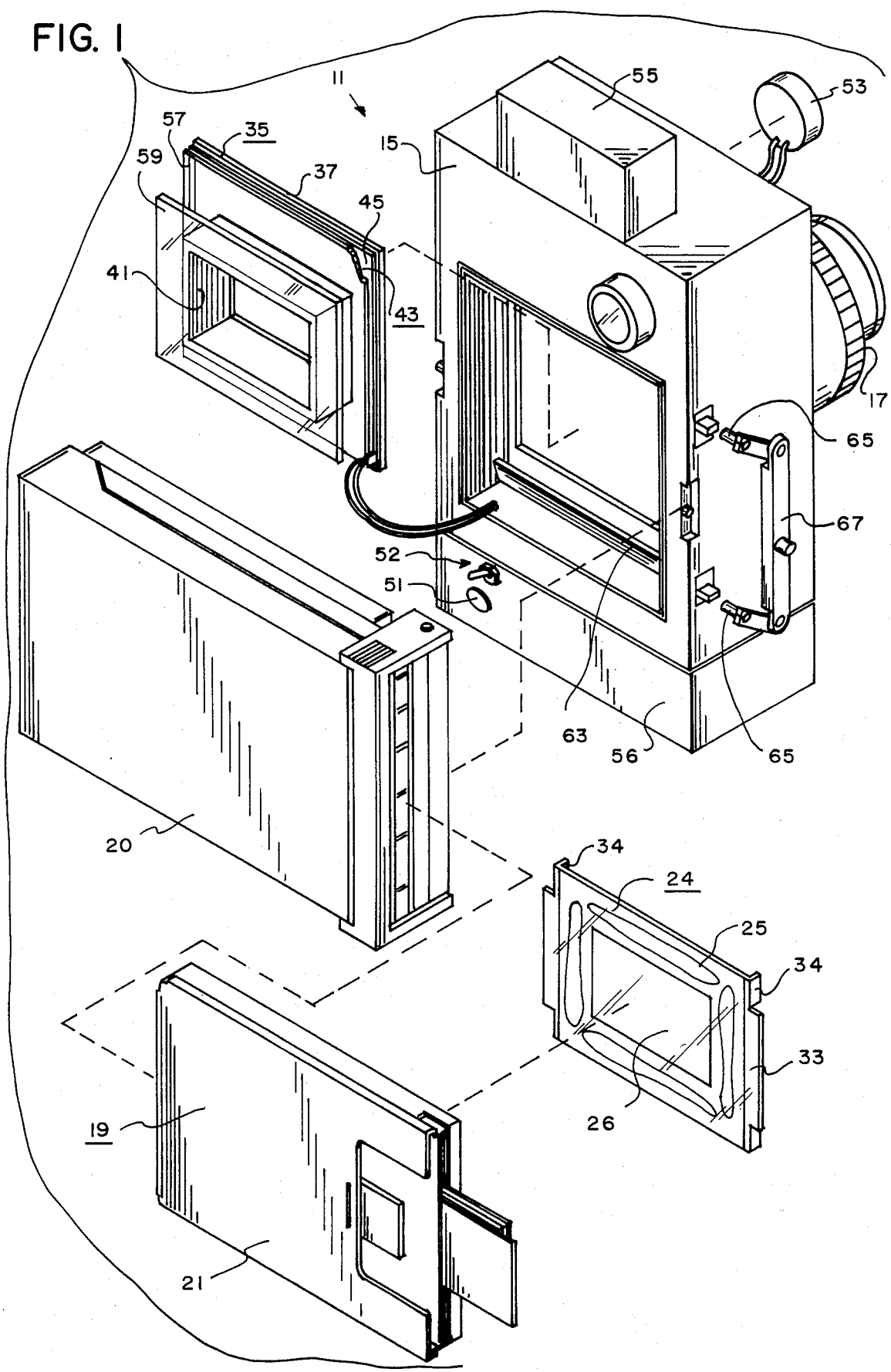
FIG. 1 is an exploded perspective view of the improved camera of the present invention with portions thereof broken away for clarity.
Figure 4:
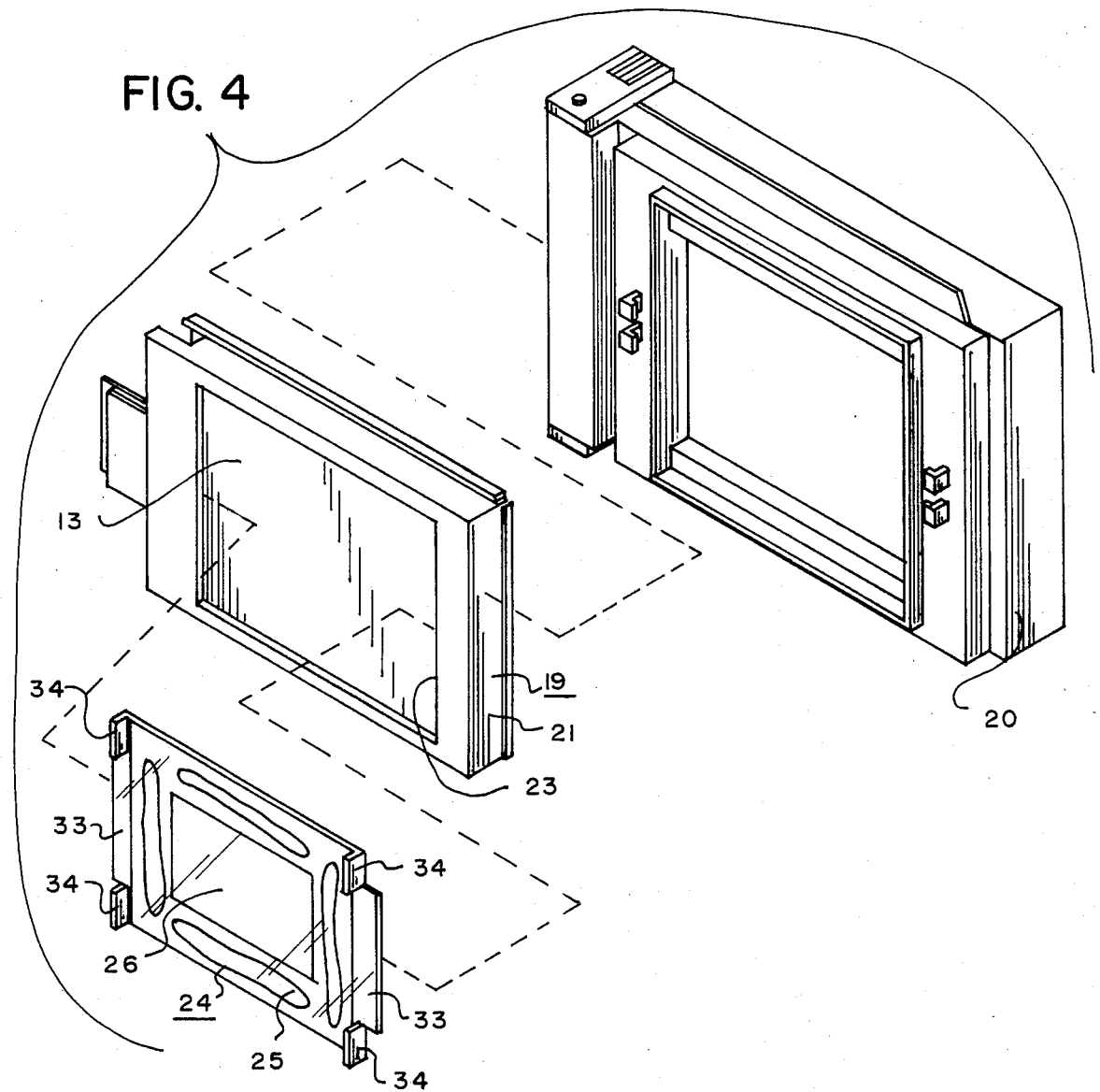
FIG. 4 is an exploded perspective view of a template meansfilm pack-film pack holder unit of the improved camera of the present invention.
Figure 5:
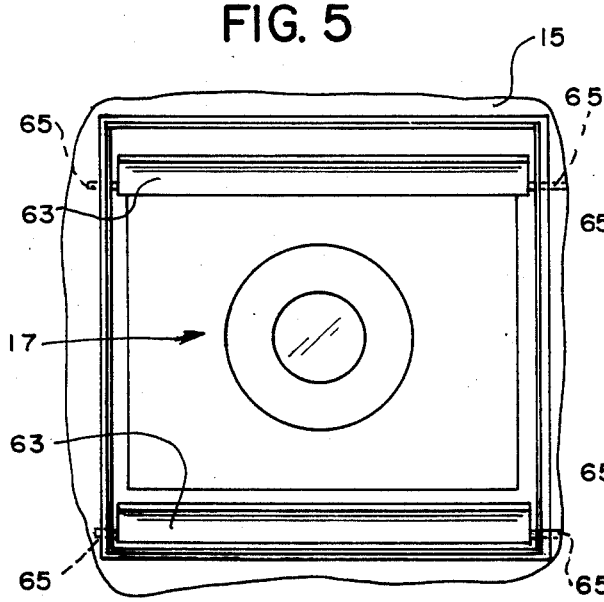
FIG. 5 is an elevational view of a portion of the interior of the body of the improved camera of the present invention showing an elevator means thereof in a first position.
Figure 6:
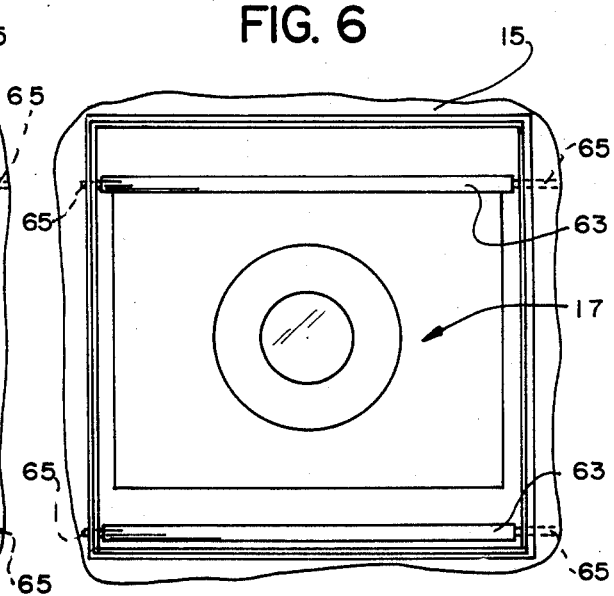
FIG. 6 is an elevational view similar to FIG. 5 but showing the elevator means in a second position.

The camera 11 of the present invention preferably consists basically of a typical camera for exposing a frame 13 of photographic film. Thus, the camera 11 includes a hollow body 15 for holding the frame 13 of photographic film and a lens/shutter means 17 attached to the body 15 for selectively allowing light from a specific photograph image to enter the body 15 and expose the frame 13 of photographic film (see, in general, FIG. 1). The specific construction and operation of the body 15 and lens/shutter means 17 may vary as will be apparent to those skilled in the art. Preferably, the camera 11 may be of the well known instant picture type such as manufactured by Polaroid for using a film pack 19. Thus, the camera 11 preferably includes a film pack holder 20 attached to the body 15 thereof for holding the film pack 19 as will be apparent to those skilled in the art (see FIG. 4). The film pack 19 is of well known construction including a housing 21 for holding a plurality of sheets of photographic film and with an opened front 23 whereby the sheet of photographic film adjacent the opened front 23 defines the frame 13 of photographic film to be exposed.

The improvement of the present invention includes a template means 24 located within the body 15 for covering the peripheral edges of the frame 13 of photographic film. The template means 24 has a border area 25 and a photograph area 26 (see FIG. 1) for dividing the frame 13 into a border area 27 about the peripheral edges thereof and a photograph area 29 within the border area 27. The template means 24 allows light to pass through at least a portion of the border area 25 to expose a sepecific border image on the border area 27 of the frame 13 of photographic film. More specifically, the template means 24 preferably consists of a transparent, generally planar sheet of plastic or the like substantially the same size and shape as the frame 13 of photographic film having a specific border image produced about the entire periphery thereof (i.e., the border area 25) for causing the specific border image to be produced on the border area 27 of the frame 13 of photographic film when light is passed therethrough. The template means 24 is adapted to be held directly against the frame 13 of the photographic film and may be attached to the housing 21 of the film pack 19 over or within the opened front 23 thereof by way of tabs 33 which extend into the housing 21, etc. The template means 24 may include inturned tabs 34 (see FIG. 4) for acting as stops to help position the template means 24 relative to the housing 21 of the film pack 19. The template means 24 may cover the entire frame 13 with the photograph area 26 thereof covering the photograph area 29 of the frame 13 being perfectly clear so as not to affect the specific photogrph image to be produced thereon. The specific construction of the template means 24 may vary as will now be apparent to those skilled in the art. Thus, for example, the template means 24 may consist of thin, transparent polyethylene or other plastic material and the specific border image may be produced thereon by way of ink, paint or the like.

Figure 7:
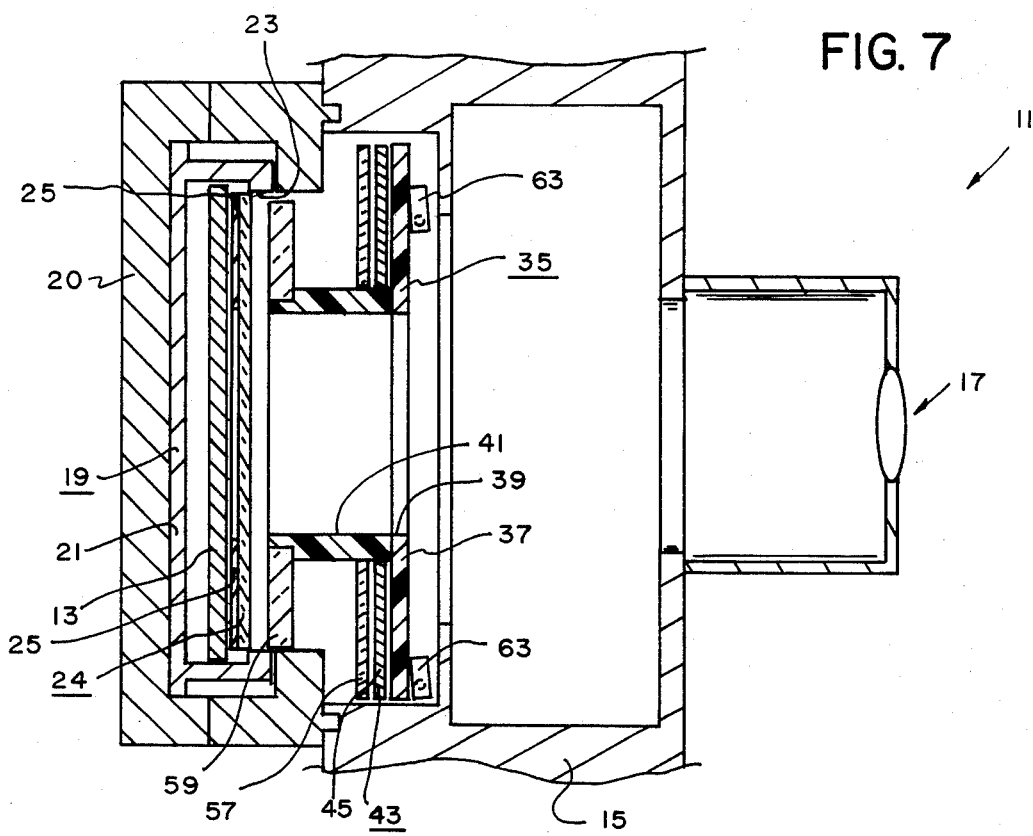
FIG. 7 is a somewhat diagrammatic sectional view of the improved camera of the present invention with the elevator means thereof in the first position.
Figure 8:
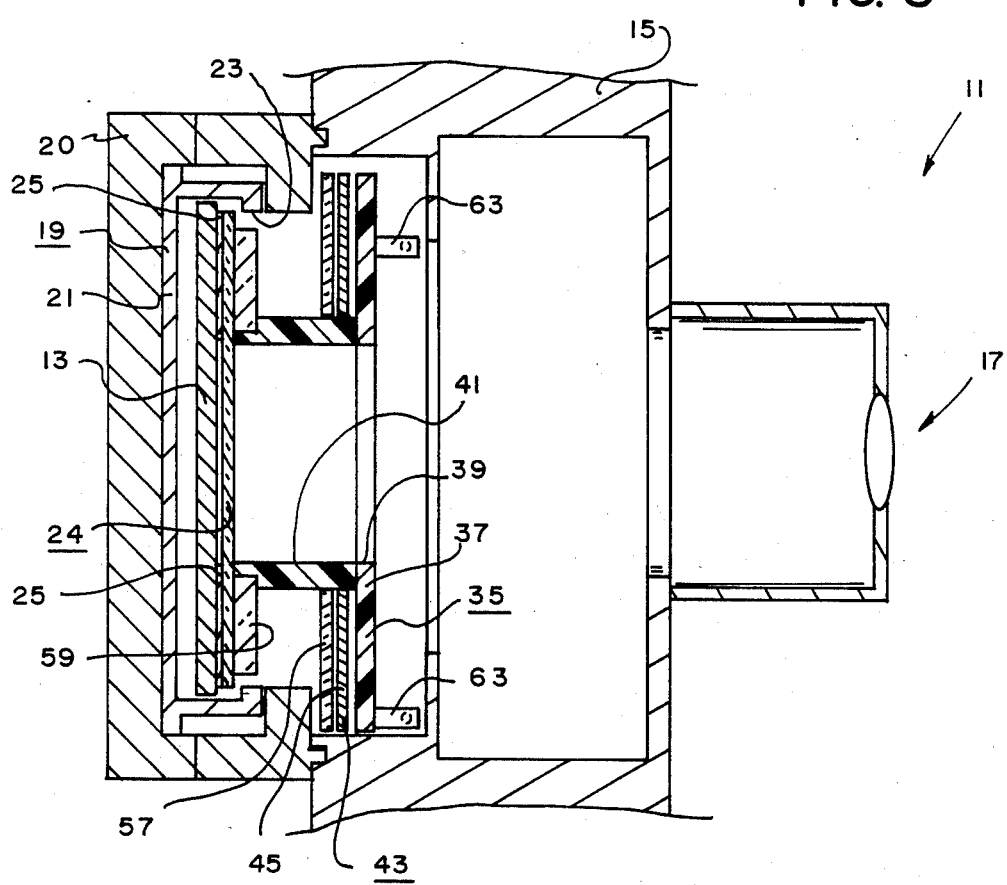
FIG. 8 is a sectional view similar to FIG. 7 but showing the elevator means in the second position.

The improvement of the present invention includes a light block means 35 (see, in general, FIGS. 2 and 3) located within the body 15 of the camera 11 for covering the border area 25 of the template means 24 and the border area 27 of the frame 13 and for preventing light from the lens/shutter means 17 from passing to the border area 27 of the frame 13. The light block means 35 preferably includes a plate member 37 constructed of an opague material or the like of substantially the same shape and size as the border area 27 of the frame 13 for being placed within the body 15 between the lens/shutter means 17 and the frame 13 in a position which will prevent any light from the lens/shutter means 17 from passing to the border area 27 of the frame 13 (see FIGS. 7 and 8). The plate member 37 preferably has an opening 39 therethrough corresponding in size and shape to the photograph area 29 of the frame 13 so as not to affect passage of light from the lens/shutter means 17 to the photograph area 29 of the frame 13. The light block means 35 preferably includes a spacer member 41 attached to the plate member 37 adjacent the opening 39 therethrough for spacing the plate member 37 away from the template means 27 for reasons which will hereinafter become apparent. The spacer member 41 is preferably constructed of an opaque material and preferably extends completely about the opening 39 in the plate member 37 to coact with the plate member 37 to completely block the border area 25 of the template means 24 and the border area 27 of the frame 13 from any light entering the lens/shutter means 17.

Figure 9:
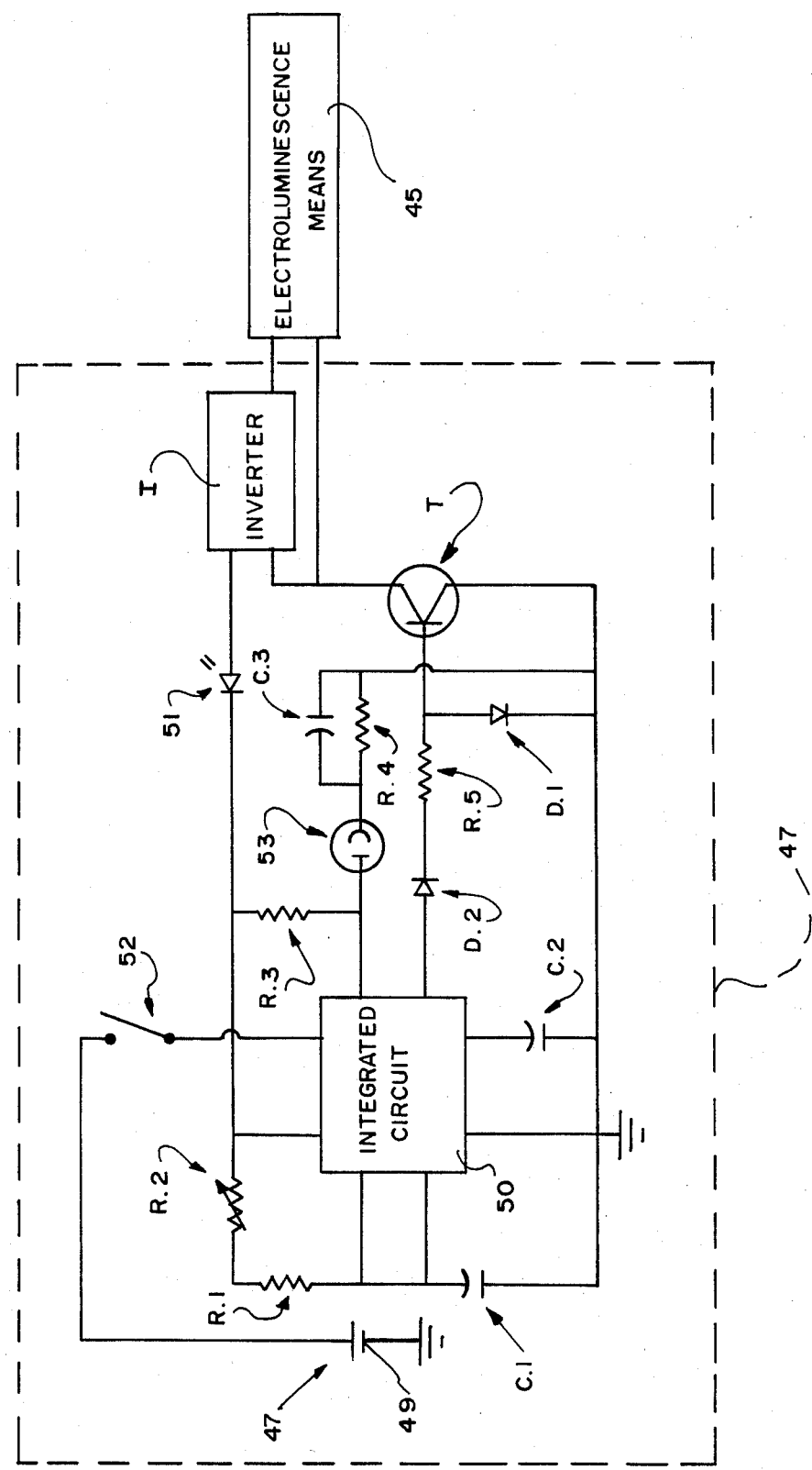
FIG. 9 is an electrical schematic view of the various electrical components of the improvement of the present invention.
Figure 10:
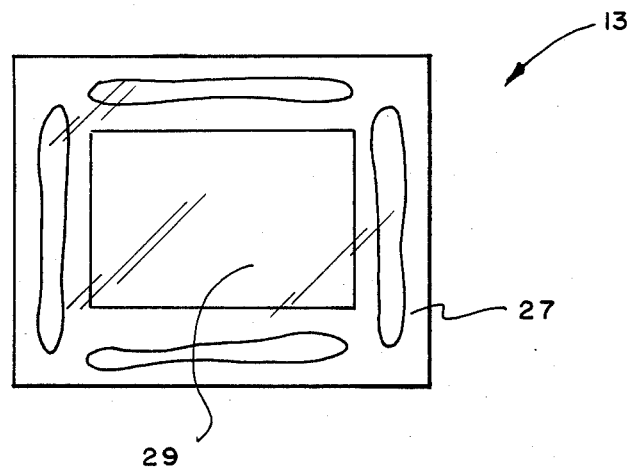
FIG. 10 is a front elevational view of a frame of photographic film as exposed using the improved camera of the present invention.

The improvement of the present invention includes light means 43 (see, in general, FIG. 2) located within the body 15 for directing light through the specific border image of the border area 25 of the template means 24 to the border area 27 of the frame 13 thereby producing an image of the specific border image of the template means 24 on the border area 27 of the frame 13. The light means 43 is located between the plate member 37 of the light block means 35 and the template means 24 within the space created by the spacer member 41. The light means 43 may be of various specific constructions for providing even lighting around the entire border area 27 of the frame 13. Preferably, the light means 41 consists of a typical electroluminescence means 45 having a shape and size corresponding to the border area 25 of the template means 24 and the border area 27 of the frame 13 to thereby provide even lighting around the entire border area 25 of the template means 24 and the entire border area 27 of the frame 13. The electroluminescence means 45 may be of typical construction now apparent to those skilled in the art. Thus, the electroluminescence means 45 may consist of a pair of translucent, conductive plastic plates separated by a thin dielectric consisting of a translucent plastic in which are embedded certain phosphors. When an alternating current is applied to the two plates, the phosphors will glow thereby emitting an even light about the entire border area 27 of the frame 13. The brightness of the light thus emitted depends upon the voltage and frequency of the alternating current as is apparent to those skilled in the art. Thus, the improvement of the present invention preferably includes a source 47 of electrical current for activating the light means 43. The source 47 of electrical current is preferably defined by an electric circuit including a standard nine volt direct current battery 49 or the like connected to the light means 43 through means for transforming the direct current of the battery 49 into an alternating current and for controlling the length of time the light means 43 is activated. The specific construction of the electric circuit may vary as will be apparent to those skilled in the art and a preferred embodiment thereof is shown in FIG. 9. Thus, for example, the electric circuit may include timing means such as a "LM 555" integrated circuit 50 for controlling the light means 43. Such "timing chips" are well known to those skilled in the art and are provided by various electrical supply companies. The circuit shown in FIG. 9 includes a fixed 180 K "select" resistor R.1 and a 100 K variable resistor R.2 coupled with a 10 μf timing capacitor C.1 to produce a Resistor-Capacitor timer of between 3 and 4 seconds. Times can be changed by the selection of a "select" resistor R.1 and/or a timing capacitor C.1 of different values. The output of the integrated circuit 50 controls a TIP120 "TTL to real world" interface transistor T. The interface transistor T, in turn, controls the power to a hybrid invertor I which inverts 5 volts direct current to 120 volts alternating current at 400 cycles. The output of the invertor I feeds the electroluminescence means 45. The circuit shown in FIG. 9 also includes a pair of 1M fixed resistors R.3, R.4, a 10 K fixed resistor R.5, a pair of 0.01 μf capacitors C.2, C.3, and a pair of 1N4148 diodes D.1, D.2 for "debounce" and bias setting as will be apparent to those skilled in the art. An indicator light such as a light emitting diode 51 is preferably included in the circuit to indicate when the source 47 of alternating current is providing alternating current to the electroluminescence means 45. A master switch means 52 is also preferably included in the circuit. Various means may be provided within the circuit to activate the timing means once the master switch is closed. Thus, for example, a switch means such as a typical photoelectric switch 53 may be provided for activating the circuit when an auxiliary flash unit 55 emits a flash of light when the lens/shutter means 17 of the camera 11 is operated to take a photograph. Thus, the photoelectric switch 53 is preferably provided adjacent the lens/shutter means 17 in a position for receiving light from the auxiliary flash unit 55 (see FIG. 1). The circuit shown in FIG. 9 thus creates a one shot oscillator with the switch 52 controlling power to all parts of this one shot oscillator. The oscillator is designed around the standard LM555 timer integrated circuit 50. The combination of resistors R.1, R.2 and capacitor C.1 form the "RC" network that determines the "on" time. Capacitor C.2 is for decoupling. Resistor R.3 is a pull up device to ensure a positive trigger when switch 53 is closed. Capacitor C.3 and resistor R.4 form a hold circuit to prevent multiple triggers if the switch 53 is held closed. Diodes D.1 and D.2 are blocking diodes and with current limiting resistor R.5, form the output signal to the transistor T. The "LED" 51 drops the voltage feeding the inverter I, while providing an external indication of an "on" condition. The inverter I is turned on by transistor T which provides a ground. Output of the inverter I is 120 VAC at 400 Hertz. The timing means of the circuit preferably causes the light means 43 to emit light for a longer period of time than the lens/shutter means 17 allows light from the specific photograph image to enter the body 15 to thereby provide a proper exposure time for both the border area 27 and the photograph area 29 of the frame 13. The specific exposure times for both the lens/shutter means 17 and the light means 43 will depend on various factors such as the specific photographic film used, etc., as will be apparent to those skilled in the art. With the exception of the photoelectric switch 53 and electrical wires running to the electroluminescence means 45 and the photoelectric switch 53, the circuit as shown in FIG. 9 is preferably contained within a box 56 which is in turn attached to the body 15 of the camera 11 (see FIG. 1).

The improvement of the present invention may include filter means 57 (see, in general, FIG. 2) located within the body 15 between the light means 43 and the border area 27 of the frame 13 for balancing and/or compensating the light emitted by the light means 43. The filter means 57 may consist of one or more translucent filter elements sized and shaped to correspond with the border area 25 of the template means 24 and the border area 27 of the frame 13 and located within the space defined by the spacer member 41 of the light block means 35 between the light means 43 and the frame 13.

A transparent plate member 59 (see, in general, FIG. 2) may be attached to the spacer member 41 opposite the plate member 37 for holding the light means 43 and filter means 57 therebetween whereby the light block means 35, light means 43, filter means 57 and transparent plate member 59 define, in effect, a single unit.

The improvement of the present invention preferably includes means for holding the transparent plate member 59 directly against the template means 24 and the frame 13 of photographic film to insure that the specific border image reproduced on the border area 27 of the frame 13 is clear, sharp and properly focused. More specifically, the camera 11 preferably includes elevator means for causing the light block means 35, light means 43, filter means 57 and transparent plate member 59 to move as a unit between a first position with the transparent plate member 59 positioned away from the template means 24 and frame 13 of photographic film (see FIG. 7) to allow the frame 13 to be easily removed from the camera 11 in the normal manner apparent to those skilled in the art, and a second position with the transparent plate member 59 held directly against the template means 24 and frame 13 of photographic film (see FIG. 8). The elevator means may be of various constructions which will now be apparent to those skilled in the art. Thus, for example, the elevator means may include a pair of bar members 63 located within the body 15 and pivotally mounted to the body 15 of the camera in such a manner that when pivoted to a first position, the light block means 35, light means 43, filter means 57, transparent plate member 59 unit will be moved to the first position and when pivoted to a second position the unit will be moved to the second position. Pivot arms 65 are fixedly attached to bar members 63 and extend from each bar member 63 out of the body 15 and are connected by a link means 67 (see FIG. 1) whereby the user of the camera 11 can merely move the link means 67 back and forth to cause the bar members 63 to pivot between the first and second positions.

To use the camera 11 of the present invention, the first step is to install the template means 24 on the film pack 19 over the cardboard protective sheet that typically covers the sheets of photographic film prior to the film pack 19 being installed in a camera. Once the template means 24 is positioned on the film pack 19 and with the bar members 63 in the first position, the film pack 19 is inserted into the camera 11 in the typical manner and the protective cardboard sheet can then be removed from the film pack 19 in the typical manner thereby positioning the template means 24 over the frame 13 of photographic film to be exposed. Prior to taking a photograph, the bar members 63 are moved to the second position thereby holding the template means 24 directly against the frame 13. When the lens/shutter means 17 is activated to take a photograph, the light means 43 will be activated simultaneously by the photoelectric switch 53 in response to the auxiliary flash unit 55 or the like thereby causing the border area 27 of the frame 13 to be exposed with the specific border image of the border area 25 of the template means 24 at the same time the photograph area 29 of the frame 13 is exposed to the specific photograph image through the lens/shutter means 17. After the frame 13 has been fully exposed, the bar members 63 are moved back to the first position and the frame 13 of photographic film can be removed from the camera 11 in the normal manner.

It should be noted that the specific border image to be produced on the border area 27 of the frame 13 of photographic film may consist merely of an aesthetic image for enhancing the photograph area 29 thereof or may consist of certain information such as a description or highlights of the specific locale where the photograph is taken, etc.

Although the invention has been described and illustrated with respect to a preferred embodiment thereof and a preferred use therefore, it is not to be so limited since changes and modifications can be made therein which are within the full intended scope of the invention.

I claim:

1. A camera for exposing a frame of photographic film, said camera comprising:
    (a) a hollow body for holding said frame of photographic film;

(b) lens and shutter means attached to said body for allowing light from a specific photograph image to enter said body;

(c) template means located within said body for covering at least the peripheral edges of said frame of photographic film to divide said frame of photographic film into a border area about the peripheral edges thereof and a photograph area within said border area and for at least partially blocking the passage of light to said border area of said frame of photographic film to expose a specific border image on said border area of said frame of photographic film;

(d) light block means located within said body for covering said border area of said frame of photographic film and for preventing light from said lens and shutter means from passing to said border area of said frame of photographic film; and (e) light means located within said body for emitting even light about said border area of said frame of photographic film through said template means.

2. The camera of claim 1 in which is included means for selectively holding said light block means against said template means and said frame of photographic film.

3. The camera of claim 2 in which is included a timing means for controlling said light means.

4. The camera of claim 3 in which is included a switch means for activating said timing means.

5. The camera of claim 4 in which said switch means includes a photoelectric switch.

6. The camera of claim 5 in which said light means includes an electroluminescence means for emitting light on activation by electrical current, said electroluminescence means corresponding in size and shape to said border area of said frame of photographic film.

7. The camera of claim 1 in which said template is substantially the same size and shape as said frame of photographic film.

8. The camera of claim 7 in which said template means consists of a transparent plastic plate having a specific border image provided about the periphery thereof for causing a specific border image to be produced on said border area of said frame of photographic film when light passes through said template means to said border area of said frame of photographic film.

9. The camera of claim 8 in which said template means has a clear, transparent photograph area for overlying said photograph area of said frame of photographic film without affecting the quality of the photograph image produced on said photograph area of said frame of photographic film through said lens and shutter means.

10. The camera of claim 1 in which said light means emits light for a longer period of time than said lens and shutter means allows light from the specific photograph image to enter said body.

11. A camera for exposing a frame of photographic film said camera comprising:

(a) a hollow body for holding said frame of photographic film;

(b) lens and shutter means attached to said body for allowing light from a specific photograph image to enter said body;

(c) template means located within said body for covering at least the peripheral edges of said frame of photographic film to divide said frame of photographic film into a border area about the peripheral edges thereof and a photograph area within said border area and for at least partially blocking the passage of light to said border area of said frame of photographic film to expose a specific border image on said border area of said frame of photographic film;

(d) light block means located within said body for covering said border area of said frame of photographic film and for preventing light from said lens and shutter means from passing to said border area of said frame of photographic film;

(e) light means located within said body for emitting even light about said border area of said frame of photographic film through said template means;

(f) timing means for causing said light means to emit light for a longer period of time than said lens and shutter means allows light from the specific photograph image to enter said body; and (g) elevator means for causing said light block means and said light means to move as a unit between a first position away from said template means and a second position adjacent said template means.

* * * * *

UNITED STATES PATENT AND TRADEMARK OFFICE
CERTIFICATE OF CORRECTION

PATENT NO. : 4,365,570
DATED : Dec. 28, 1982
INVENTOR(S) : Robert S. Jamieson

It is certified that error appears in the above-identified patent and that said Letters Patent are hereby corrected as shown below:

Column 5, line 8, "handing" should read ---hanging---.

Column 7, line 11, "48" should read ---49---.

Column 8, line 2, "no" should read ---not---.

In claim 8, column 11, line 33, "downward" should read ---downwind---.

Signed and Sealed this

Third Day of May 1983

[SEAL]

Attest:

GERALD J. MOSSINGHOFF

Attesting Officer     Commissioner of Patents and Trademarks